United States Patent [19]
Litchford

[11] 3,735,408
[45] May 22, 1973

[54] COMMON AZIMUTH SECTOR INDICATING SYSTEM

[75] Inventor: George B. Litchford, Northport, N.Y.

[73] Assignee: Litchstreet Co., Northport, N.Y.

[22] Filed: Apr. 5, 1971

[21] Appl. No.: 130,952

[52] U.S. Cl.......343/112 CA, 343/6.5 R, 343/6.5 LC
[51] Int. Cl................................................G01s 9/56
[58] Field of Search ................343/112 CA, 100 LE, 343/6.5 R, 6.5 LC

[56] References Cited
UNITED STATES PATENTS

| | | |
|---|---|---|
| 3,550,129 | 12/1970 | Steele............................343/112 CA |
| 3,626,411 | 12/1971 | Litchford..........................343/6.5 R |
| 3,566,404 | 2/1971 | Sorkin.............................343/112 CA |
| 3,341,846 | 9/1967 | McMurren et al..............343/100 LE |
| 3,094,695 | 6/1963 | Jahn.................................343/100 LE |

Primary Examiner—Benjamin A. Borchelt
Assistant Examiner—G. E. Montone
Attorney—Henry Huff

[57] ABSTRACT

A proximity warning system for aircraft, using only the signals emitted by secondary surveillance radar and cooperating transponder equipped aircraft, to indicate presence of an intruder in a defined common azimuth sector which is wider than the radar beam, and to provide range information regarding such an intruder based on a side lobe suppression signal transmitted by the radar.

10 Claims, 9 Drawing Figures

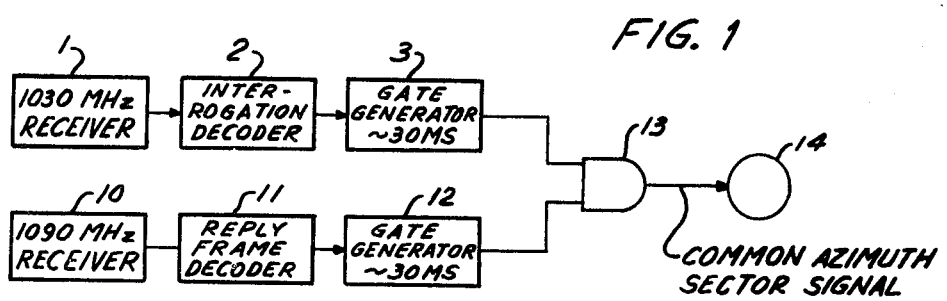
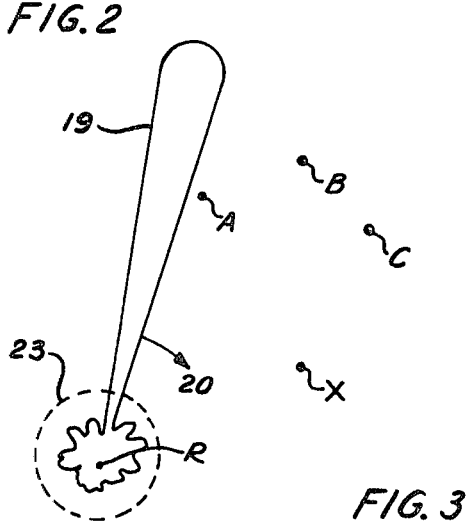
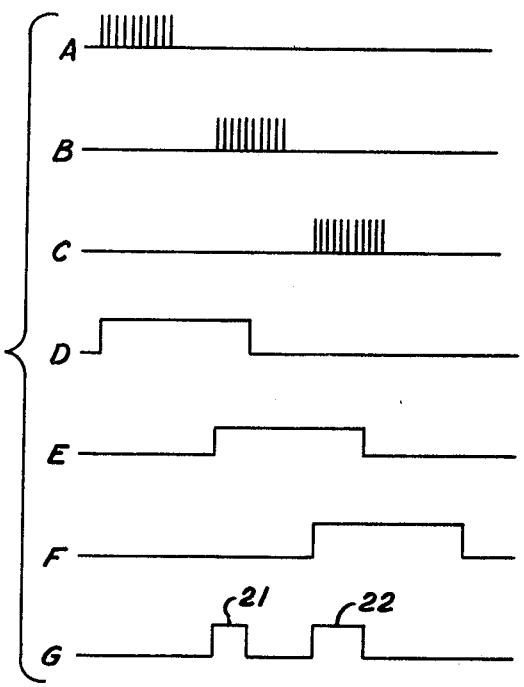
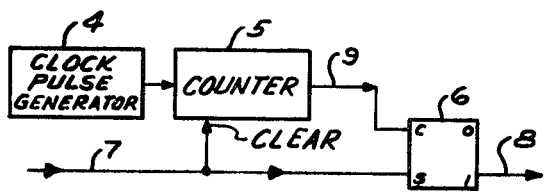

INVENTOR.
GEORGE B. LITCHFORD

COMMON AZIMUTH SECTOR INDICATING SYSTEM

BACKGROUND

1. Field

This invention pertains to radio proximity indicating means for mobile craft, particularly for warning of the incipient approach of two such craft to each other in order that timely maneuvers may be made to avoid collision. More generally, the invention relates to apparatus for determining the positions of mobile craft with respect to each other within a radiation field emitted from a reference location.

2. Prior Art

Radiolocation of mobile craft by radar is in use at airports and harbors for traffic control, including the detection of potential collision situations. Major airports are equipped with secondary surveillance radar (SSR) adapted to cooperate with transponder beacons carried on aircraft to discriminate against interference and ground clutter and to provide for transmission of identification and other data such as altitude from the craft to the ground-based radar. A traffic controller observing the radar display directs the pilots of the involved aircraft by radio, usually with voice communication, so as to maintain or restore safe separations between craft.

Such systems, however elaborate and well-staffed, are limited in capability because each craft must be dealt with individually and requires its share of the controller's time and attention and its share of the available radio spectrum. When traffic is heavy, takeoffs and landings are delayed, and the possibility of collisions increases.

The number of mid-air collisions and near misses has become so large in busy areas that numerous inter-aircraft cooperative proximity warning systems have been proposed. Those more prominently under study or development at this time involve frequent or quasi-continuous exchange of signals between all cooperative aircraft within the region of interest and make no provision for non-cooperating aircraft, except perhaps a need for legislation to exclude them. The required airborne equipment would be bulky and expensive, use more of the already crowded radio spectrum and would be greatly independent of other needed and existing equipment, such as transponders. Another drawback of some of the proposed systems is that they provide only relative positional information, without ground reference but in effect with respect to a randomly floating reference.

SUMMARY

According to this invention, radio receiver apparatus is arranged to receive interrogations from a directionally scanning-beam transmitter such as a secondary surveillance radar, and also the resulting reply transmissions from cooperating transponder equipped stations. Interrogations are received only during the time of passage of the scanning beam, called the "dwell" time. Replies are received during the dwell time only from transponders located within a common azimuth sector of twice the effective width of the scanning beam. To provide coordinated monitoring of transponders within a defined wider common azimuth sector, representations of the most recently received interrogation and the most recently received reply are stored for predetermined lengths of time. Coexistence of such stored representations indicates the presence of a transponder within the wider common azimuth sector.

Many standard secondary surveillance radars transmit omnidirectionally a side lobe suppression signal. This signal is used as a timing reference for measurement of the relative transit time delay of a transponder reply to provide a range indication.

All commercial transport aircraft and nearly all other aircraft that utilize major airports are now equipped with transponders. The present invention enables the use of this existing equipment for proximity indication by relatively small and inexpensive additional apparatus, and without interference with the original transponder function or need for more radio spectrum.

The invention is generally applicable to other purposes besides the immediately compelling one outlined above; for example, to inter-craft positional indication for marine traffic around a harbor or to certain en route operations using repeaters and initiating transmitters at reference locations or obstructions.

DRAWINGS

FIG. 1 is a block diagram of a simple basic embodiment of the invention.

FIG. 2 is a plan view representation of a typical positional relationship between a secondary surveillance radar and several aircraft within its service area, also depicting the directional pattern of the radar.

FIGS. 3A through 3G are graphical representations of various temporally related signals produced in the operation of the system of FIG. 1.

FIG. 4 is a block diagram of a gate generator.

DESCRIPTION

Figure 5:
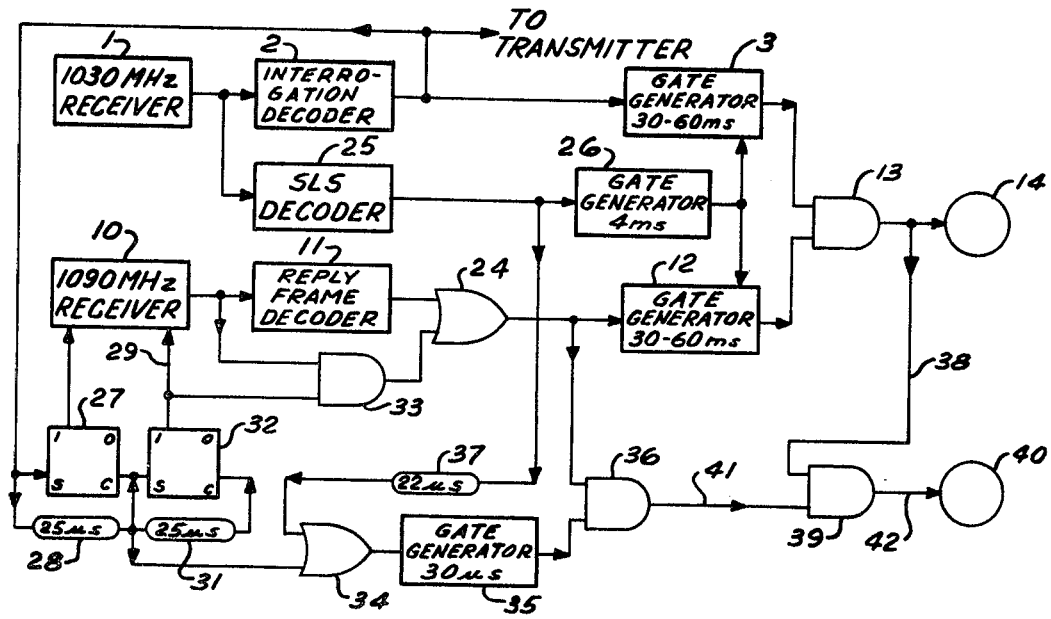
FIG. 5 is a block diagram of a modification of the system of FIG. 1.

Referring to FIG. 1, a receiver 1, operating at 1030 MHz, is adapted to receive the interrogation signals transmitted from a standard secondary surveillance radar (SSR), and is connected to an interrogation decoder 2. The receiver 1 and the decoder 2 may be parts of an ordinary SSR transponder, operating in usual manner to produce a reply trigger pulse in response to each properly coded interrogation signal that is received.

The decoder 2 is coupled to a gate generator 3, which is designed to produce a gate signal as a dc output at some nominal voltage level, beginning with the application of a trigger pulse and terminating after a predetermined gate time interval, say 30 milliseconds. The gate generator is resettable, in the sense that another trigger pulse occurring during the existence of a previously started gate signal will cause the gate signal to continue a full gate interval after that pulse.

Referring to FIG. 4, a suitable gate generator comprises a clock pulse generator 4, a pulse counter 5, and a flip flop 6 connected as shown. An input pulse on line 7 clears the counter 5 and sets the flip flop 6 to its "1" condition, energizing the output line 8. When the counter has counted a number of clock pulses equivalent to the desired gate time interval, it produces an output pulse on line 9, clearing the flip flop and deenergizing line 8, thereby terminating the gate signal.

If another pulse appears on line 7 before the counter has completed its count, the counter is cleared and restarts from zero. The flip flop simply remains set. When the gate has been terminated, the counter may recycle, producing pulses on line 9. These do not affect the flip flop, which remains in its clear, or "0" state until another input pulse appears on line 7.

Returning to FIG. 1, a receiver 10, operating at 1090 MHz, is adapted to receive the reply signals emitted by any transponders within its range in response to SSR interrogations. The receiver 10 may be similar to receiver 1 except for its operating frequency, or it may be a simpler device with lower sensitivity, as it is required only to receive signals from transponders within a radius of say twenty miles. The receiver 10 is connected through a reply frame decoder 11 to a gate generator 12, similar to gate generator 3. The outputs of gate generators 3 and 12 go to respective input terminals of a coincidence circuit such as an AND gate 13, represented in the drawing by the conventional symbol for such a device. The output terminal of gate 12 is connected to an indicator or alarm device 14.

Figure 8:
FIG. 8 is a graphical representation of a reply signal transmitted by a transponder in response to an interrogation from a secondary surveillance radar.
Figure 9:
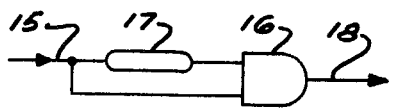
FIG. 9 is a diagram of a pulse decoder.

The reply frame decoder 11 is similar to the interrogation decoder 2, but designed to produce an output pulse in response to the so-called "framing" pulses F1 and F2 of a standard transponder reply signal, see FIG. 8. Both decoders 2 and 11, and others to be discussed later, are devices for detecting the occurrence of two pulses separated by a predetermined time interval. Referring to FIG. 9, each input pulse on line 15 is applied to one input of an AND gate 16 through a delay means 17, and directly to the other input of the AND gate. The delay is made equal to the interval between the two pulses of interest. The first pulse reaches the AND circuit through the delay means at the same time the second pulse reaches the AND circuit directly, producing an output pulse on line 18. Although the delay means 17 is schematically represented by the conventional symbol as a separate device, it and other similar delay means in the system may be provided by a clock pulse generator and a shift register arranged in accordance with known present-day practice of digital techniques.

Referring to FIG. 2, the solid line 19 represents the directive pattern, including the main beam and associated side lobes, of a secondary surveillance radar located at the point R. The entire pattern rotates as indicated by the arrow 20 at a rate of from 4 to 15 rpm. The effective width of the main beam is typically from 3 to 6°. Assume that the transponder-equipped aircraft are currently located at points A, C, and X, and that aircraft carrying the equipment of FIG. 1 is at point B. As the beam rotates past A, the transponder receives a series of perhaps 20 or more interrogations, at intervals of around 2 to 3 milliseconds, depending upon the repetition rate of the particular radar. Each interrogation is followed within about 3 microseconds by a reply from the transponder. The replies from the transponder at point A are received by the receiver 10 at point B, validated as actual reply signals by the reply frame decoder 11, and appear as respective single pulses at the input to the gate generator 12. These pulses are illustrated in FIG. 3A. The first pulse starts the gate generator 12 and each subsequent pulse resets it. When the trailing edge of the beam 19, FIG. 2, passes beyond point A, the pulse train of FIG. 3A stops, leaving the gate generator 12 set to run for an additional 30 milliseconds.

The output of the gate generator 12 is illustrated in FIG. 3D. As the leading edge of the main beam reaches point B of FIG. 2, interrogations are received by the 1030 MHz receiver 1. These are decoded by the interrogation decoder 2, producing a train of output pulses illustrated in FIG. 3B. The first pulse of this train starts the gate generator 3, and each subsequent pulse resets it. The output of gate generator 3 is shown in FIG. 3E. As the trailing edge of the main beam leaves the point B, the last pulse of FIG. 3B resets the gate generator 3 to run for an additional 30 milliseconds. It is seen that, although points A and B are never within the main beam simultaneously, the final portion of the output of gate generator 12 overlaps the initial portion of the output of gate generator 3, producing a coincidence of inputs to AND gate 13. The output of the gate 13 at this time is represented by the signal 21 in FIG. 3G. This and similar signals are referred to as common azimuth sector signals and are displayed or indicated by the indicator means 14.

After the trailing edge of the main beam has passed the point B and before the leading edge has reached the point C, no signals are transmitted or received by any of the aircraft represented in FIG. 2. However, the gate generator 3 continues to produce an output for 30 milliseconds following the last decoded interrogation, as shown in FIG. 3E. When the leading edge of the beam reaches the point C, the transponder there begins to transmit a train of reply pulses which are decoded by the decoder 11. The resulting output of the decoder 11 is shown in FIG. 3C. As before, the first pulse of this train starts the gate generator 12, and each subsequent pulse resets it. The output of the gate generator 12 at this time is shown in FIG. 3F. It will be seen that the initial part of this output overlaps the final portion of the output of gate generator 3, again producing a coincidence at the AND gate 13 and producing an output 22 as shown in FIG. 3G.

When the main beam finally reaches point X and the transponder there begins to operate, the gate generator 3 has run out, and so no indication occurs on the indicator 14. Thus, the system of FIG. 1 monitors an azimuthal sector about point B for replies of other aircraft within that sector. The width of the sector is preferably two to three times the effective width of the main beam of the radar, and is determined by the durations of the gates produced by gate generators 3 and 12. Replies from transponders outside the common azimuth sector are of no interest in determining possible proximity situations, and are ignored by the system of FIG. 1.

Figure 6:
FIG. 6 is a graphical representation of an interrogation signal as received from a secondary surveillance radar.

Referring to FIG. 6, a typical interrogation as received from a standard SSR consists of three pulses, P1, P2, and P3. The interval between P1 and P3 determines the interrogation mode. Two such modes, called mode 3/A and mode C, are used in civil aviation. The respective P1 to P3 intervals are 8 and 21 microseconds. The second pulse P2 is a control pulse that follows P1 after an interval of 2 microseconds in all interrogation modes, and is intended for use in side lobe suppression (SLS).

Returning to FIG. 2, the SSR radiates pulses P1 and P3, but not P2, in the rotating directive pattern 19. Pulse P2 is radiated in a non-rotating omnidirectional pattern shown by the dash line 23, at an amplitude exceeding that of P1 and P2 in the side lobe region of the rotating pattern 19. All modern transponders are arranged to compare the amplitudes of P1 and P2 when received, and reply only when P1 is greater than P2 by a specified amount. In "improved" SLS, P1 is radiated in both patterns 19 and 23, P2 in pattern 23 only, and P3 in pattern 19 only. The Federal Aviation Administration of the U.S. Department of Transportation has stated its intention to provide all SSR installations under its jurisdiction with improved SLS, and to require all aircraft transponders to be equipped with SLS capability.

In some embodiments of the present invention, the control pulse P2 is used for other purposes in addition to and unrelated to side lobe suppression, without interference with or degradation of the originally intended SLS function. One of these additional purposes is to automatically widen the common azimuth sector in the general neighborhood of the SSR; another is to provide a "synthetic trigger" pulse for a range warning based on differential transit time when actual trigger pulses are absent because the system is outside the main beam.

Referring to FIG. 5, the receiver 1, interrogation decoder 2 and gate generator 3 are arranged as in FIG. 1, and receiver 10, reply frame decoder 11 and gate generator 12 are similarly connected, with the addition of an OR gate 24 between the decoder and the gate generator. The receiver 1 is connected also to an SLS decoder 25, which may be as shown in FIG. 9, with the delay means 17 designed to provide a delay of two microseconds.

The decoder 25 is connected to a gate generator 26 of the type shown in FIG. 4, designed with a gate time interval somewhat longer than maximum expected interrogation repetition interval, say 4 milliseconds. The gate generators 3 and 12 are in this instance provided with gate width control means, which, when energized, increase the gate time interval by some predetermined amount such as 30 milliseconds. The width control means may be for example a switch device arranged to cut in an additional binary stage in the counter 5 of FIG. 4.

The receiver 1, as part of a standard transponder or similar thereto, includes a video threshold device that inhibits output of detected pulses of amplitudes below the threshold level. At distances of more than perhaps 20 to 30 miles from the SSR, no P2 pulses will appear in the receiver output because they are radiated at only the relatively low amplitude needed to exceed the side lobes of the rotating beam, and will be below the threshold. Uder these conditions the SLS decoder 25 produces no output, gate generator 26 remains off, and the system of FIG. 5 as thus far described operates in the same manner as that of FIG. 1.

Within the side lobe suppression area surrounding the SSR where the P2 pulse is received with sufficient amplitude to overcome the receiver threshold, the SLS decoder 25 produces an output pulse in response to each P1 – P2 pair that is received, setting and continuing to reset gate generator 26. The output of gate generator 26 maintains the gate time intervals of gate generators 3 and 12 at their increased values, in this example, 60 milliseconds, as long as the condition persists. The resulting common azimuth sector is twice the angular width of that outside the side lobe suppression area.

In a standard transponder, the output of the interrogation decoder provides a trigger pulse to actuate the 1090 MHz reply transmitter, and disables the 1030 MHz receiver for about 100 microseconds. If used with a transponder as is generally contemplated, the receiver 10 must also be disabled during reply transmissions. To this end, the interrogation decoder is connected directly to the set input terminal of a flip flop 27, and through a 25 microsecond delay 28 to the clear input terminal. The "1" output of the flip flop 27 is connected to disabling means in the receiver 10, which may be the same as the disabling means in the 1030 MHz transponder receiver.

Each output pulse from the interrogation decoder 2 sets the flip flop 27, energizing the "1" output terminal and disabling the receiver 10. After an interval of 25 microseconds, during which the transponder completes a reply, the delayed pulse from delay 28 clears the flip flop 27, deenergizing the "1" output terminal and terminating disablement of receiver 10.

The receiver 10, like the receiver 1, includes a threshold device which in this instance is provided with a control line 29 which, when energized, raises the threshold level by about 3 db, for example. The output of delay device 28 is connected directly to the set terminal, and through a further 25 microsecond delay 31 to the clear terminal, of a flip flop 32. The "1" output of the flip flop 32 goes to control line 29.

The delay 31 and flip flop 32 operate to raise the threshold level of the receiver 10 during the first 25 microseconds following the end of each disablement for a transponder reply. The "1" output of the flip flop 32 also enables an AND gate 33 to couple the output of receiver 10 directly to the OR gate 24, thus bypassing the reply frame decoder 11 during each said first 25 microseconds of operation of receiver 10. This arrangement ensures that the OR gate 24 will provide output and start the gate generator 12 when the system is used with a transponder and is receiving replies from another transponder within a sector encompassed by the main beam, and at a position such that only the latter part of its reply is received after termination of disablement of receiver 10. The increased threshold level takes advantage of the fact tht such partial replies must come from a transponder that is relatively nearby, and therefore are strong, to discriminate against generally weaker accidental noise pulses or interference.

The delayed trigger output from delay device 28 is applied by way of an OR gate 34 to a gate generator 35 of the type shown in FIG. 4, designed to provide a gate duration interval of 30 microseconds, for example. The output of gate generator 35 is applied to an AND gate 36, which also receives the output of OR gate 24. The OR gate 34 receives a second input from the SLS decoder 25, through a delay 37 of, in this example, 22 microseconds. The output of AND gate 36 goes to one of the inputs of an AND gate 39. The other input of gate 39 is supplied from the output of the common azimuth sector AND gate 13. The output of gate 39 is connected to indicator 40.

The gate generator 35, AND gate 36 and the elements associated with them cooperate to produce a range warning signal on line 41 in response to a reply or part of a reply received from another transponder. The expression "range warning signal", used in this context, means a signal which indicates that a reply has been received from a transponder located within a time gate-selected, nearby region of space. Considering first the case in which the equipment of FIG. 5 is outside the effective range of the SLS coverage, but within the interrogation area of an SSR, each interrogation received as the beam sweeps by will produce a pulse from decoder 2. After a delay of 25 microseconds in device 28, this pulse starts the gate generator 35 at the same time the disablement of receiver 10 is terminated.

Any pulse received by the 1090 MHz receiver during the next 25 microseconds, and strong enough to pass the receiver threshold, is assumed to be part of a reply from another transponder in response to the same interrogation. Such a pulse passes through AND gate 33 and OR gate 24 to AND gate 36, which is enabled at this time by the output of gate generator 35 and accordingly provides a range warning signal on line 41. The common azimuth sector signal existing at this time enables gate 39, allowing the range warning signal to actuate the indicator 40.

After expiration of the 25 microsecond delay in device 31, the threshold of receiver 10 is lowered and gate 33 is disabled. Signals subsequently received by receiver 10 will not reach the gate 24 unless confirmed as actual replies by the decoder 11. Each such confirmed reply will produce a single pulse which, if it occurs during the 30 microsecond gate interval of gate generator 35, will be passed by gate 36 and produce a range warning signal. Any decoded signals received after expiration of the gate interval are assumed to be from transponders too distant to be of immediate interest. The gate duration of generator 35 may be made adjustable, if desired, to accommodate varying traffic densities.

Considering next the case in which the equipment of FIG. 5 is within the effective range of the SLS coverage, and recalling that both P1 and P2 are transmitted in the omnidirectional pattern 23 of FIG. 2, it is seen that the SLS decoder 25 will produce a pulse in response to every interrogation transmitted by the SSR, regardless of the position of the main beam. Each such pulse, after delay in device 37, starts the gate generator 35.

During most of the SSR rotation period of about 5 to about 15 seconds, the main beam is pointed in some other direction and no P3 pulse is received by receiver 1. Thus the decoder 2 produces no output and the receiver 10 is not disabled but remains open. Any reply received from another transponder, regardless of its location, will, after decoding by frame decoder 11, appear at gate 36 as a single pulse. This pulse, if it occurs while gate 36 is enabled by the signal from gate generator 35, will produce a range warning signal on line 41. However, the indicator 40 will not be actuated unless a common azimuth sector signal is also present at this time to enable gate 39. Thus any range warning signals produced by replies from transponders outside the common azimuth sector are disregarded.

During the 30 milliseconds or so while the main beam is received by receiver 1, the interrogation decoder 2 will operate as described previously and range warning signals may be produced in the same manner as in the case when the system is outside the SLS area. Each pulse from SLS decoder 25 will start the gate generator early and redundantly, without effect on the range warning operation.

In summary, the system of FIG. 5 operates to provide common azimuth sector warning in the manner of FIG. 1, automatically changes the width of the monitored sector roughly according to distance from the SSR, provides range warning when in the main beam outside the SLS region, and provides range warning throughout the common azimuth sector inside the SLS region.

Many transponders now in use are provided with altitude digitizer units for automatically reporting barometric altitude in response to mode C interrogation. The standard altitude reporting code is described in Advisory Circular No. 00—27, dated Jan. 1, 1969, of the Federal Aviation Administration, U.S. Department of Transportation. FIG. 8 illustrates a typical reply, wherein the arrangement of information pulses between the framing pulses F1 and F2 represents some particular altitude.

Figure 7:
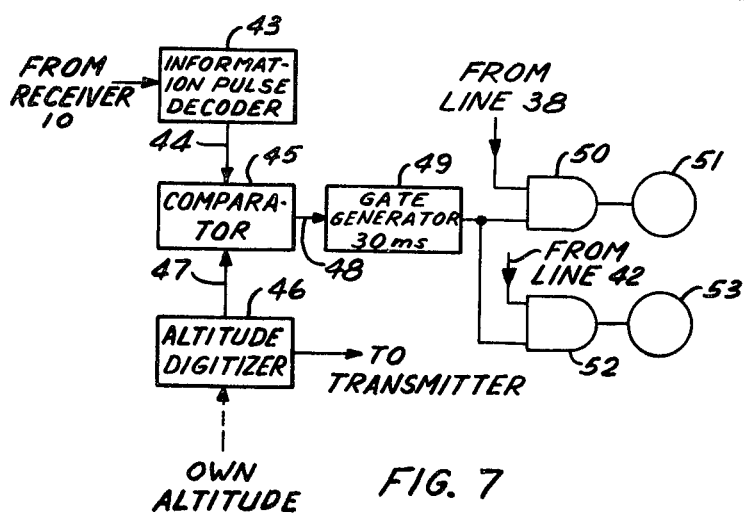
FIG. 7 is a block diagram showing the additional parts of a modification of the system of FIG. 5.

Referring to FIG. 7, an information pulse decoder 43 is connected to the output of the 1090 MHz receiver 10 of FIG. 5. Decoder 43 may be similar to the corresponding device which is provided in a ground based SSR for processing mode C replies. The output of decoder 43 appears as a pattern of binary voltage states on respective conductors of a multiple line 44. This pattern represents, in binary coded decimal form for example, the altitude reported in the most recently received reply. Line 44 forms one input to a comparator 45.

An altitude digitizer 46 of known type provides another input to the comparator 45 on multiple line 47. The input on line 47 is similar in form to that on line 44, but represents the craft's own altitude as sensed by the barometric altimeter.

The comparator 45 may be a known arrangement of a parallel binary adder adapted to add the bit pattern on one of the multiple input lines to the complement of that on the other, and provide an output on line 48 when the two inputs are equivalent, or approach equivalence to a degree representing some altitude difference within desired limits such as plus or minus 500 feet. Line 48 goes to a gate generator 49 of the type shown in FIG. 4, designed for a gate time interval of 30 milliseconds. An AND gate 50 is connected to an indicator 51, and receives one of its inputs from gate generator 49. The other input is supplied from the common azimuth sector warning signal line 38 of FIG. 5. Another AND gate 52 is connected to an indicator 53 and receives one input from gate generator 49 and another input from range and common azimuth sector warning signal line 42.

In the operation of the apparatus of FIG. 7, a representation of the altitude report most recently received by receiver 10 is compared with a similar representation of craft's own altitude. When the represented altitudes differ by less than a preset amount, which may be adjustable, the gate generator 49 is started, enabling gates 50 and 52. If a common azimuth sector warning signal exists or occurs while gate 50 is enabled, indicator 51 is actuated, providing a warning that another aircraft is within both the common azimuth sector and the common altitude stratum being monitored. If a common azimuth and range warning signal exists or occurs while gate 52 is enabled, indicator 53 is actuated, providing a combined indication of common azimuth sector, common altitude stratum and range warning.

I claim:

1. A common azimuthal sector indicating system, utilizing interrogation signals transmitted by a standard azimuthally scanning secondary surveillance radar (SSR) and reply signals transmitted by a transponder replying to the interrogation signals, for monitoring an azimuth sector wider than the rotating main beam of the radar, comprising:
   a. means for receiving said interrogation signals during the passage of the rotating main beam,
   b. means for receiving said transponder reply signals transmitted by said transponder as it is interrogated by the rotating main beam,
   c. means for producing a first signal for a predetermined length of time following reception of an interrogation signal,
   d. means for producing a second signal for a predetermined length of time following reception of a reply signal, and
   e. means for producing a common azimuth sector indicating signal in response to coexistence of said first and second signals.

2. The invention set forth in claim 1, further including means responsive to a side lobe suppression control signal transmitted by the SSR to change said predetermined length of time of at least one of said first and second signals.

3. The invention set forth in claim 1, wherein said means for receiving said interrogation signals also receives a side lobe suppression control pulse transmitted by the SSR before and after the passage of the main beam, further including:
   a. means for delaying said received side lobe suppression control pulse by an amount greater than the delay between the last pulse of a normal interrogation signal and the first pulse of a normal transponder reply signal,
   b. means for generating a third signal in response to the most recent delayed side lobe suppression control pulse for a predetermined length of time, p1 c.
   means responsive to coexistence of said third signal and a transponder reply signal to produce a range warning signal,
   d. an indicator, and
   e. means responsive to coexistence of said range warning signal and said common azimuth sector indicating signal to actuate said indicator.

4. The invention set forth in claim 1, wherein said indicating system is arranged on an own aircraft and the transponder is located on another aircraft, said invention further including means for decoding altitude reporting signals in the transponder reply signals from said other aircraft, means for producing similar own aircraft altitude reporting signals, means for comparing said altitude reporting signals to produce common altitude stratum signals, and co-altitude common azimuth sector indicator means responsive to simultaneous presence of said common altitude stratum signals and said common azimuth sector indicating signals.

5. The invention set forth in claim 3, wherein said indicating system is arranged on an own aircraft and the transponder is located on another aircraft, said invention further including means for decoding altitude reporting signals in the transponder reply signals from said other aircraft, means for producing similar own aircraft altitude reporting signals, means for comparing said altitude reporting signals to produce common altitude stratum signals, and indicator means responsive to simultaneous presence of said common altitude stratum signals and said range warning and common azimuth sector indicating signals.

6. A common azimuthal sector indicating system, utilizing interrogation signals transmitted by a standard azimuthally scanning secondary surveillance radar and reply signals transmitted by a transponder replying to the interrogation signals, for monitoring an azimuth sector wider than the rotating main beam of the radar, comprising:
   a. first receiver means for receiving said interrogation signals during the passage of the rotating main beam,
   b. second receiver means for receiving said transponder reply signals transmitted by said transponder as it is interrogated by the rotating main beam,
   c. timing means, responsive to said first receiver means, for producing a signal when the rotating main beam is directed within a selected azimuth sector of its full rotation, and
   d. means, responsive to said second receiver means and to said timing means, for producing a common azimuth sector indicating signal.

7. A common azimuthal sector indicating system, utilizing interrogation signals transmitted by a standard azimuthally scanning secondary surveillance radar and reply signals transmitted by a transponder replying to the interrogation signals, for monitoring an azimuth sector wider than the rotating main beam of the radar, comprising:
   a. means responsive to reception of said interrogation signals during passage of the main beam to produce a first signal during and for a predetermined length of time following reception of said interrogation signals;
   b. means responsive to reception of said transponder reply signals transmitted by said transponder as it is interrogated by the rotating main beam to produce a second signal during and for a predetermined length of time following reception of said reply signals;
   c. means for producing a common azimuth sector indicating signal in response to coexistence of said first and second signals.

8. A common azimuthal sector indicating system for a craft, utilizing interrogation signals transmitted by a standard azimuthally scanning secondary surveillance radar and reply signals transmitted by a transponder in another craft replying to the interrogation signals, for monitoring an azimuth sector wider than the rotating main beam of the radar, comprising:
   a. means for receiving said interrogation signals during scanning of the craft by the rotating main beam,
   b. means for receiving said transponder reply signals transmitted by said transponder in the other craft as it is interrogated by the rotating main beam,
   c. means for producing a first signal in response to interrogation signals received during the scanning of the craft, the first signal being maintained for a time interval equal to that required for the main beam to rotate through the angle that said wider sector extends beyond the leading edge of the main beam,
   d. means for providing a second signal in response to reply signals received during scanning of the other craft, said second signal being maintained for an interval equal to that required for the main beam to rotate through the angle that such wider sector extends beyond the trailing edge of the main beam, and e. means for producing a common azimuth sector indicating signal in response to coexistence of said first and second signals.

9. A common azimuthal sector indicating method, utilizing interrogation signals transmitted by a standard azimuthally scanning secondary surveillance radar and reply signals transmitted by a transponder replying to the interrogation signals, for monitoring an azimuthal sector wider than the rotating main beam of the radar, comprising the steps of producing a first signal during and for a predetermined length of time following reception of the interrogation signals during passage of the main beam, producing a second signal during and for a predetermined length of time following reception of the reply signals transmitted by the transponders and producing a common azimuth sector indicating signal in response to coexistence of the first and second signals.

10. A common azimuthal sector indicating method to monitor the existence of an intruding craft, comprising the steps of receiving at one location interrogation signals during scanning of the location by a rotating main beam transmitted by a standard azimuthally scanning secondary surveillance radar; receiving at the one location transponder reply signals transmitted by a transponder on an intruding craft when the transponder is interrogated by the rotating main beam; producing a first signal during and for a predetermined length of time following reception of the interrogation signals; producing a second signal during and for a predetermined length of time following reception of the reply signals; and producing a common azimuth sector indicating signal in response to coexistence of the first and second signals.

* * * * *